US012434824B2

(12) United States Patent
Bottasso et al.

(10) Patent No.: US 12,434,824 B2
(45) Date of Patent: Oct. 7, 2025

(54) ROTOR FOR AN AIRCRAFT CAPABLE OF HOVERING

(71) Applicant: LEONARDO S.P.A., Rome (IT)

(72) Inventors: Luigi Bottasso, Samarate (IT); Stefano Poggi, Samarate (IT); Phil Woody, Samarate (IT); Fabrizio Losi, Samarate (IT); Alessandro Nava, Samarate (IT); Sergio Sartori, Samarate (IT); Roberto Simonetta, Samarate (IT); Alessandro Airoldi, Samarate (IT); Matteo Boiocchi, Samarate (IT)

(73) Assignee: LEONARDO S.P.A., Rome (IT)

( * ) Notice: Subject to any disclaimer, the term of this patent is extended or adjusted under 35 U.S.C. 154(b) by 120 days.

(21) Appl. No.: 18/007,579

(22) PCT Filed: May 26, 2021

(86) PCT No.: PCT/IB2021/054604
§ 371 (c)(1),
(2) Date: Dec. 1, 2022

(87) PCT Pub. No.: WO2021/260459
PCT Pub. Date: Dec. 30, 2021

(65) Prior Publication Data
US 2023/0234701 A1    Jul. 27, 2023

(30) Foreign Application Priority Data

Jun. 25, 2020   (EP) ..................................... 20182377

(51) Int. Cl.
*B64C 27/32*     (2006.01)
*B64C 27/28*     (2006.01)
(Continued)

(52) U.S. Cl.
CPC .............. *B64C 27/32* (2013.01); *B64C 27/28* (2013.01); *B64C 27/82* (2013.01);
(Continued)

(58) Field of Classification Search
CPC ........... B64D 35/00; B64C 27/12; F16D 3/74; F16D 2003/745
See application file for complete search history.

(56) References Cited

U.S. PATENT DOCUMENTS

| | | | | |
|---|---|---|---|---|
| 1,501,187 A | * | 7/1924 | Rayfield | .................. F16D 3/74 464/80 |
| 2,870,617 A | * | 1/1959 | Peters | ..................... F16D 3/845 464/175 |

(Continued)

FOREIGN PATENT DOCUMENTS

| | | |
|---|---|---|
| CN | 110617277 A | 12/2019 |
| EP | 276945 B | 8/1988 |

(Continued)

OTHER PUBLICATIONS

International Search Report and Written Opinion in corresponding International Patent Application No. PCT/IB2021/054604, mailed Jul. 20, 2021 (16 pages).

*Primary Examiner* — William L Gmoser
(74) *Attorney, Agent, or Firm* — Leason Ellis LLP

(57) ABSTRACT

A rotor for an aircraft is described, comprising an input shaft rotatable around a first axis; an output member rotatable around a second axis; a coupling element functionally interposed between the input shaft and the output member and adapted to transmit the motion from the input shaft to the output member; the coupling element is configured to allow, in use, a fixed or variable inclination between the respective first and second axes; the coupling element comprises at least a first corrugated element made of an elasti- (Continued)

cally deformable material; the first corrugated element allows the inclination through elastic deformation.

11 Claims, 9 Drawing Sheets

(51) Int. Cl.
 *B64C 27/82* (2006.01)
 *B64C 29/00* (2006.01)
 *B64D 35/00* (2006.01)
 *F16D 3/72* (2006.01)
(52) U.S. Cl.
 CPC .......... *B64C 29/0033* (2013.01); *B64D 35/00* (2013.01); *F16D 3/725* (2013.01)

(56) References Cited

U.S. PATENT DOCUMENTS

| | | | | |
|---|---|---|---|---|
| 3,055,195 | A * | 9/1962 | Olson | F16D 3/74 165/181 |
| 5,054,716 | A * | 10/1991 | Wilson | B64D 35/00 244/66 |
| 5,360,376 | A * | 11/1994 | Baldino | B64C 27/14 464/154 |
| 5,564,982 | A * | 10/1996 | Gipson | F16D 1/0847 403/291 |
| 6,413,164 | B1 * | 7/2002 | Vogl | F16D 3/72 464/79 |
| 9,764,829 | B1 * | 9/2017 | Beckman | B64C 29/0033 |
| 10,364,848 | B2 | 7/2019 | Mueller et al. | |
| 2003/0222171 | A1 * | 12/2003 | Zoppitelli | F16D 3/70 244/10 |
| 2017/0203837 | A1 | 7/2017 | Gmirya et al. | |
| 2018/0023631 | A1 | 1/2018 | Mathis et al. | |

FOREIGN PATENT DOCUMENTS

| | | |
|---|---|---|
| EP | 1088755 B | 4/2001 |
| EP | 1346910 A1 | 9/2003 |
| GB | 2082730 A | 3/1982 |
| GB | 2113349 A | 8/1983 |
| WO | 2010128378 A2 | 11/2010 |
| WO | 2014203671 A1 | 12/2014 |

* cited by examiner

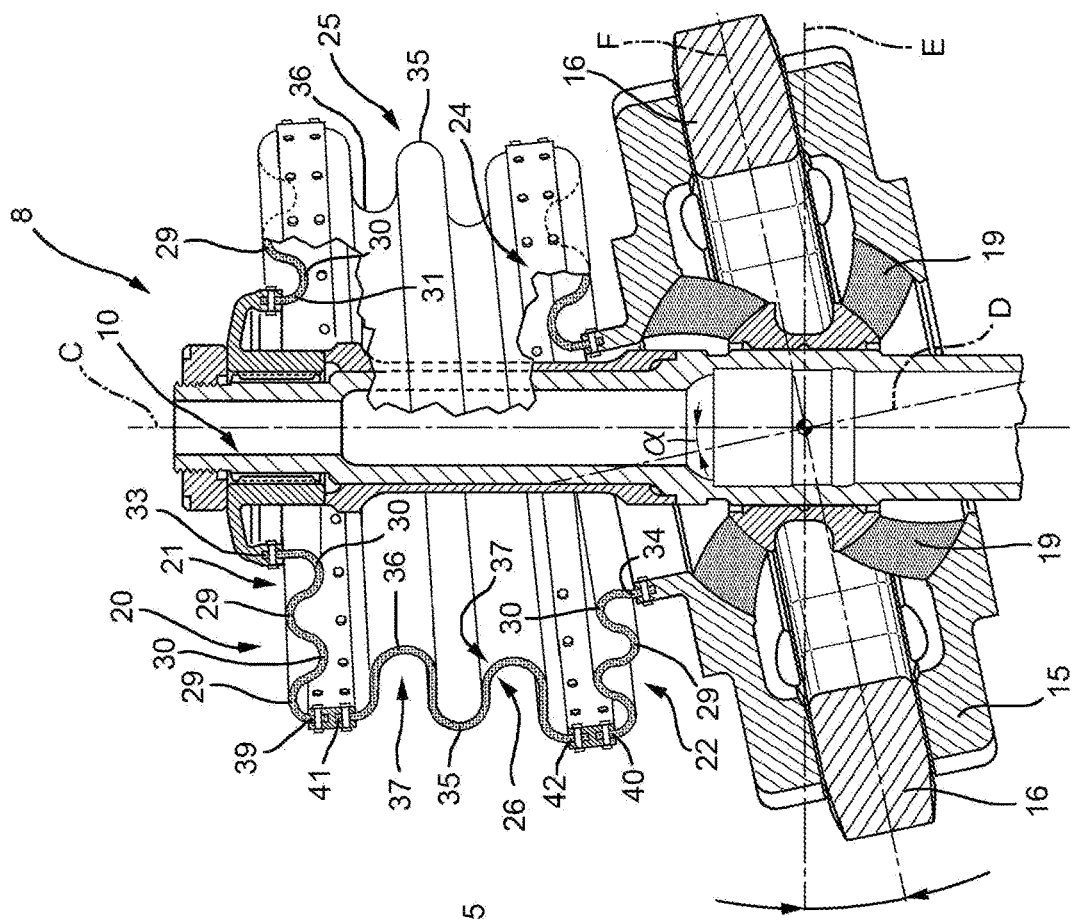
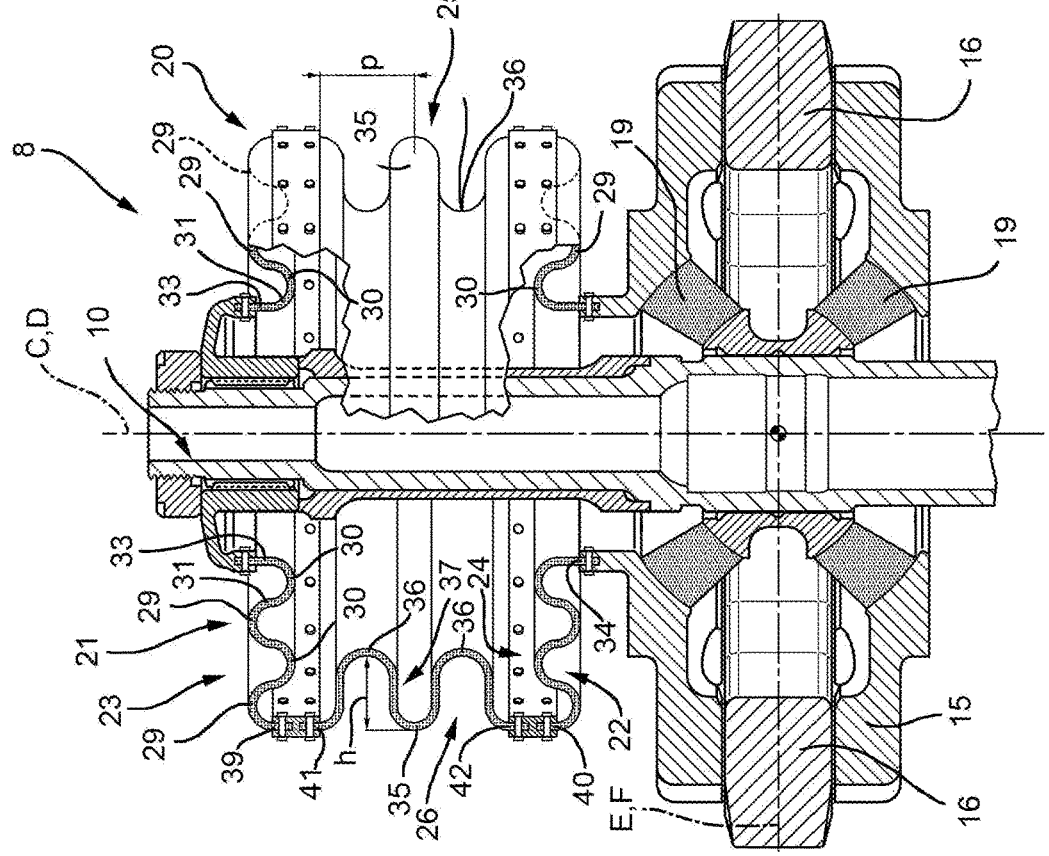

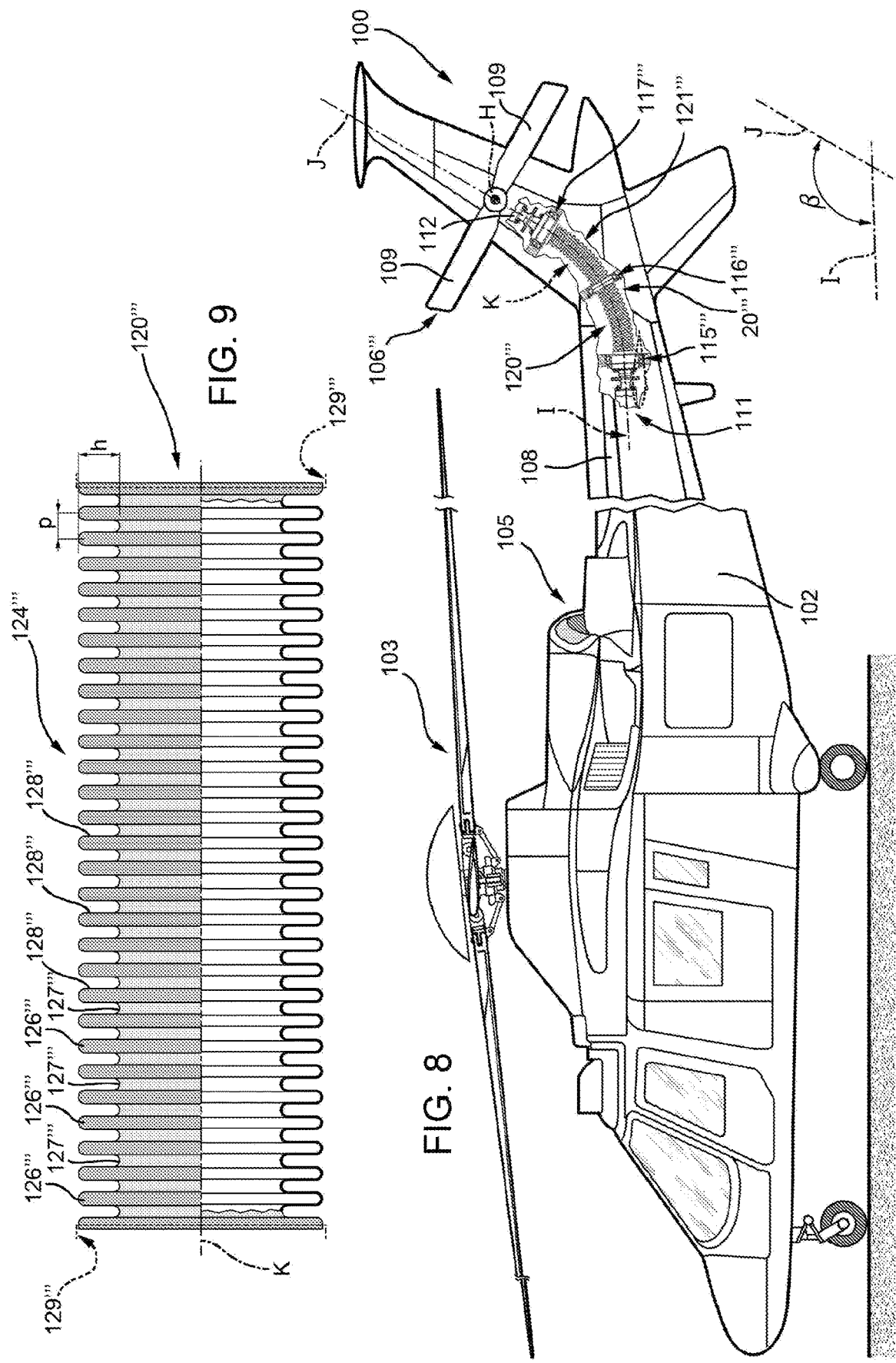

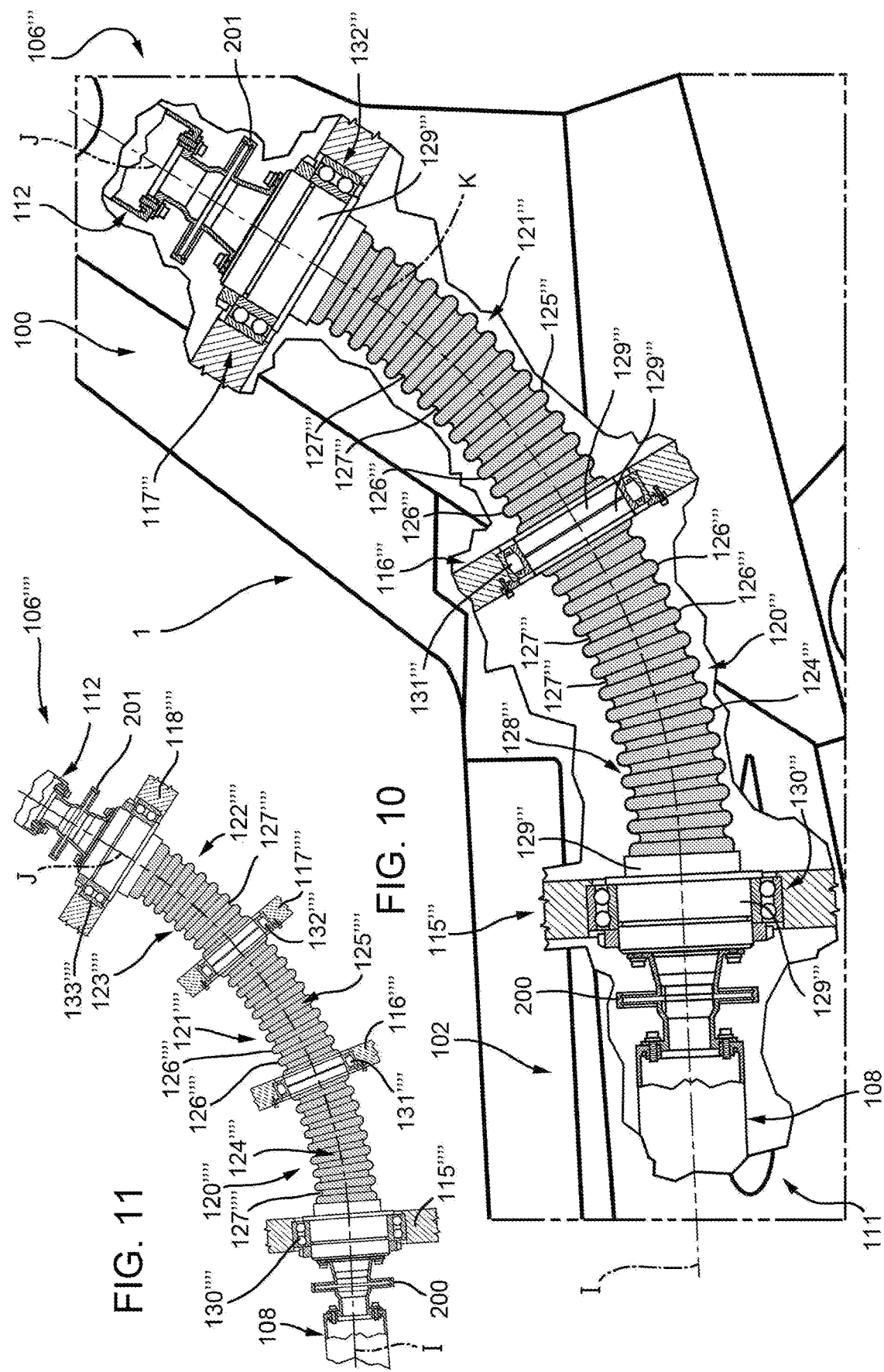

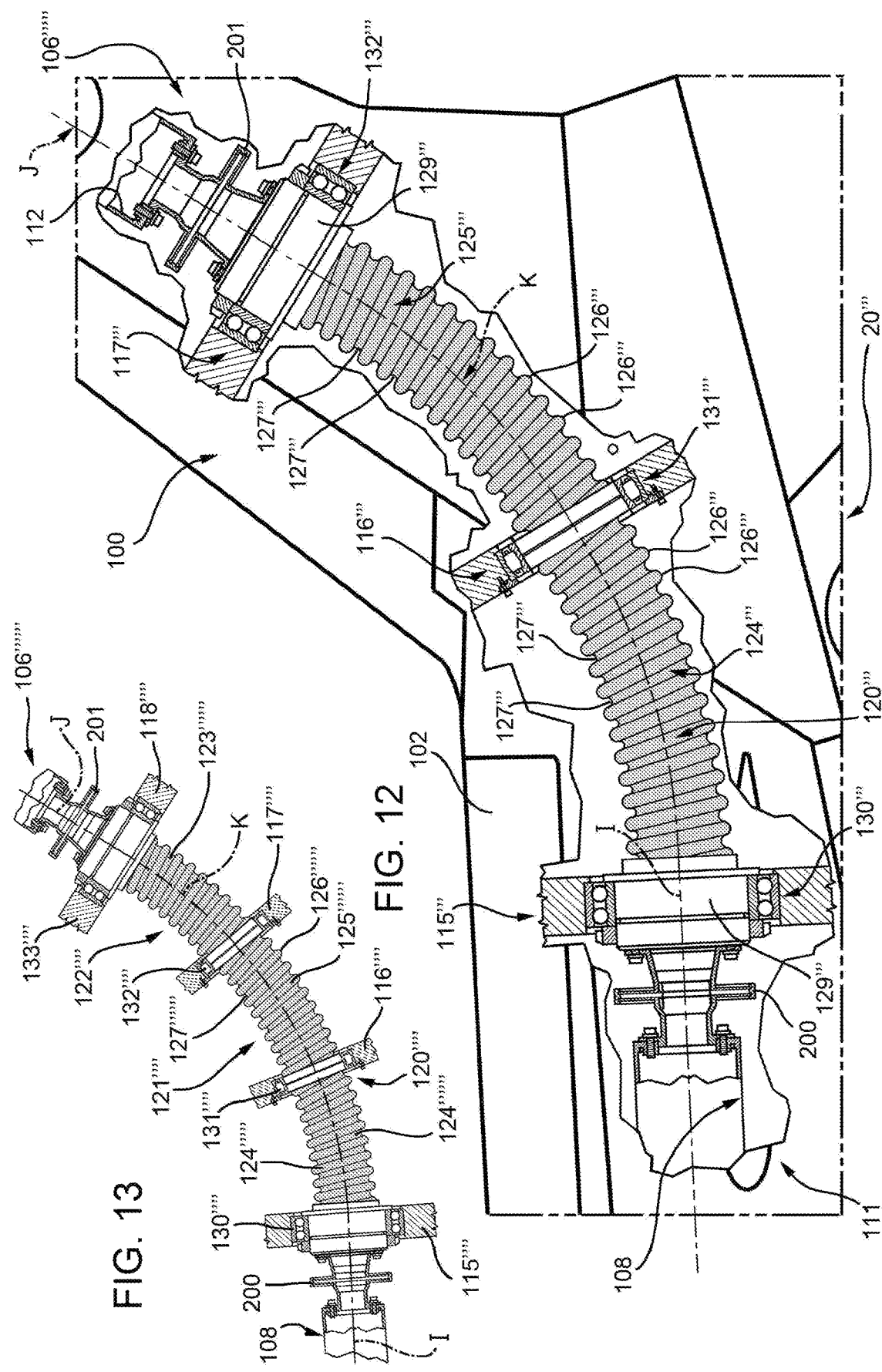

ROTOR FOR AN AIRCRAFT CAPABLE OF HOVERING

CROSS-REFERENCE TO RELATED APPLICATIONS

This Patent Application is a U.S. National Phase Application under 35 U.S.C. § 371 of International Patent Application No. PCT/IB2021/054604, filed on May 26, 2021, which claims priority from European Patent Application No. 20182377.0, filed on Jun. 25, 2020, which is incorporated by reference, as if expressly set forth in their respective entireties herein.

TECHNICAL FIELD

The present invention relates to convertiplane.
The present invention also relates to a helicopter.

BACKGROUND ART

In greater detail, convertiplanes of the known type essentially comprise:
- a fuselage extending along a first longitudinal axis;
- a pair of half-wings protruding in a cantilever manner from respective parts of the fuselage opposite one another, and having respective free ends opposite to the fuselage and aligned along a second transverse axis substantially orthogonal to the first longitudinal axis; and
- a pair of nacelles carrying respective power units, each formed by a respective motor and a respective propeller.

Each propeller is rotatable around a relative third axis.
The convertiplanes are also able to selectively assume:
- an "airplane" configuration, in which the propellers are arranged with respective third axes substantially parallel to the first axis of the convertiplane itself and define respective power units of the convertiplane itself; or
- a "helicopter" configuration, in which the propellers are arranged with the respective third axes substantially vertical and transverse to the first axis of the convertiplane.

Each propeller comprises, in a known way:
- a control shaft driven in rotation around the relative third axis by the relative motor;
- a hub operatively connected to the control shaft and rotatable around a relative fourth axis; and
- a plurality of blades articulated on the control shaft and carried by the hub, in particular distributed circumferentially around the free end of the control shaft which projects from the respective nacelle.

Each propeller further comprises an articulated joint, for example an elastomeric joint of the spherical type, interposed between the control shaft and the hub.

This occurs because, unlike the solutions normally used in helicopters, the hubs of the convertiplanes are free to oscillate with respect to the control shaft by the aforesaid angle.

Said articulated joint allows the oscillation up to a certain maximum angle, for example twelve degrees, between the fourth axis of the hub and the third axis of the control shaft.

Said oscillations are due to the aerodynamic not perfectly symmetrical forces acting on the blades, for example due to a gust or to the variation of the cyclic pitch of the blades themselves. Alternatively, said oscillations are generated in case of transition of the convertiplane between the "airplane" and "helicopter" configurations, or gyroscopic forces are generated in the event of perturbations acting on the blades.

In solutions of the known type, for example from EP-B-1088755 and EP-B-276945, the articulated joint is homokinetic, i.e. the ratio between the angular speeds of the hub and the control shaft does not depend on the angular position of the two latter.

More particularly, the articulated joints of the known type comprise a plurality of rigid elements articulated with one another so as to allow the transmission of a high torque value and at the same time the misalignment between the respective fourth axis of the hub and third axis of the control shaft.

Furthermore, the need to reduce the number of articulated components and to simplify the homokinetic joint of the rotors of the convertiplanes as much as possible is felt in the sector.

Helicopters essentially comprising a fuselage, a main rotor located at a top of the fuselage and rotatable around its own fifth axis, and an anti-torque rotor arranged at a tail end of the fuselage are also known.

Helicopters also comprise, in a known way, one or more motor members, for example turbines, and a transmission group interposed between the turbines and the main rotor and adapted to transmit the motion from the turbines to the main rotor itself.

In greater detail, the anti-torque rotor comprises, in turn:
- a control shaft rotatable around a sixth axis;
- a hub rotatable around the sixth axis; and
- a plurality of blades articulated on the hub, protruding in a cantilever manner from the hub itself and each extending along respective seventh axes transverse to the sixth axis.

The helicopter also comprises:
- an intermediate shaft connected to a power take-off of the transmission group and rotatable around an eighth axis inclined with respect to the sixth axis; and
- a pair of bevel gear wheels in engagement with each other and interposed between the intermediate shaft and the control shaft of the anti-torque rotor.

The need to connect the intermediate shaft and the control shaft of the anti-torque rotor with a homokinetic coupling element that allows high load capacity and torsional rigidity coupled with low flexural and axial rigidity is felt in the sector.

US-A-2018/023631 discloses a flexible coupling includes a flexible diaphragm body having a first end and a second end. A member is fixed to the first end of the flexible diaphragm body. A splined member is fixed to the second end of the flexible diaphragm body. The splined member is configured to shift relative to a rotatable member rotatably fixed thereto in response to axial displacement of rotatable members interconnected by the flexible coupling. The ratio of inner diameter to the outer diameter is selected to allow for packaging the flexible coupling in a confined space.

US-B-10364848 discloses a drive coupling with first and second coaxial end adapters. A first set of at least two coaxial helical elements has a first end of each element attached to the first end adapter, and a second end of each element is coupled to the second end adapter. At least one biasing device biases the end adapters relative to each other. Torque applied to one of the end adapters is transferred through the first set of helical elements to the other end adapter, the helical elements allowing for misalignment of the end adapters during operation.

GB-A-2113349 discloses a constant velocity universal joint comprises an input element connected to an output element through the intermediary of a torque transmitting member in the form of a bellows made of flexible filamentary material reinforced by a binder capable of accommodating elastically the strain resulting from angular displacement between the axes of rotation of the input and output elements. The joint is preferably made by a method which comprises forming the bellows by applying filamentary material about an internal bellows shaping former and applying a flowable but settable reinforcing binder to the filamentary material. The former may be made of corrugated flexible material, subjected to internal fluid pressure while the filamentary material is wound onto it and left inside the bellows after formation. The bellows may comprise a plurality of interconnected disc-like elements.

GB-A-2082730 discloses a light weight composite coupling capable of carrying high torsional loads while accommodating angular and axial misalignment between adjoining shafts.

DISCLOSURE OF INVENTION

The object of the present invention is to realise a rotor for an aircraft capable of hovering, which allows to satisfy at least one of the needs specified above in a simple and economical way.

According to the invention, this object is achieved by a convertiplane as claimed in claim 1.

The present invention also relates to a helicopter as disclosed in the appended claims.

BRIEF DESCRIPTION OF THE DRAWINGS

For a better understanding of the present invention, seven preferred non-limiting embodiments are described below, purely by way of example and with the aid of the attached drawings, in which:

FIGS. 3 and 4 illustrate on a further enlarged scale a joint of the rotor of FIG. 2 in respective different operating positions and with parts removed for clarity's sake;

FIG. 8 is a side view of a helicopter comprising an anti-torque rotor according to a fourth embodiment of the present invention;

FIG. 9 illustrates on a greatly enlarged scale some components of a transmission line of the anti-torque rotor of FIG. 8;

FIG. 10 is a partially sectioned side view on a greatly enlarged scale of a helicopter comprising the anti-torque rotor according to the fourth embodiment of the invention, with parts removed for clarity's sake;

FIG. 11 illustrates some components of an anti-torque rotor according to a fifth embodiment of the present invention;

FIG. 12 is a partially sectioned side view on a greatly enlarged scale of a helicopter comprising a rotor according to a sixth embodiment of the present invention, with parts removed for clarity's sake; and FIG. 13 illustrates some components of an anti-torque rotor according to a seventh embodiment of the present invention.

BEST MODE FOR CARRYING OUT THE INVENTION

Figure 1:
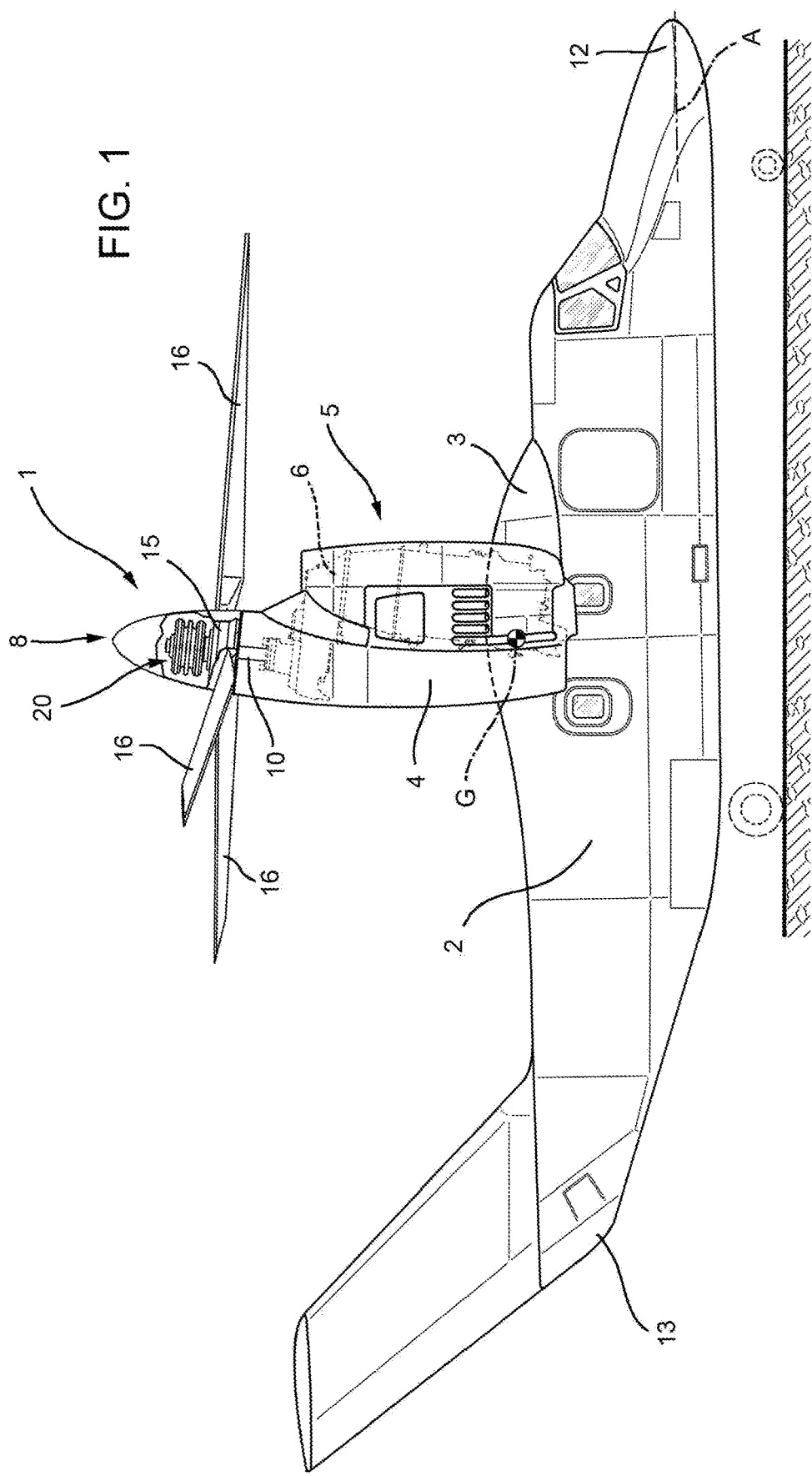
FIG. 1 is a side view of a convertiplane comprising a pair of rotors realised according to the dictates of a first embodiment of the present invention and in a "helicopter" configuration.

With reference to FIGS. 1 to 7, 1 indicates an aircraft capable of hovering, in particular a convertiplane.

The convertiplane 1 essentially comprises:
a fuselage 2 having an axis A of longitudinal extension;
a pair of half-wings 3 extending in a cantilever manner from respective parts opposite one another of the fuselage 2 and transversely to the axis A; and
a pair of nacelles 4 housing respective power unit groups 5 and inclinable with respect to the fuselage 2 around an axis G orthogonal to the axis A.

The fuselage 2 also comprises a nose 12 arranged at the front and a tail portion 13 that are opposite one another along the axis A.

The half-wings 3 have respective directions of longitudinal extension parallel to the axis G orthogonal to the axis A.

It should be noted that the term "front", "of tail", "longitudinal", "lateral", "above" and "below" and the like used in this description refer to a normal direction of advancement of the convertiplane 1 in forward flight.

In the following of the present description a single power unit group 5 is described, being the power unit groups 5 identical to each other.

The power unit group 5 essentially comprises (FIG. 2):
a motor 6 provided with an output shaft 7 rotatable around an axis B orthogonal to the axis G;
a propeller 8 rotatable around an axis C parallel to the axis B; and
a transmission group 11 interposed between the output shaft 7 of the motor 6 and a control shaft 10 of the propeller 8.

In the case illustrated, the axes B, C are parallel to and offset from each other.

The convertiplane 1 can be selectively arranged:
in a "helicopter" configuration (visible in FIG. 1), in which the axes C of the propellers 8 are orthogonal to the axis A; and
in an "airplane" configuration (not illustrated), in which the axes C of the propellers 8 are parallel to the axis A.

The transition of the convertiplane 1 between the "helicopter" and "airplane" configurations is achieved by inclining the propellers 8 around the axis G.

In the case illustrated, the propellers 8 are inclined integrally with the nacelles 4 and with the power unit groups 5 around the axis G during the aforesaid transition.

The propeller 8 comprises, in turn:
a joint 20 interposed between the control shaft 10 and the hub 15;
a hub 15 having an axis D; and
a plurality of blades constrained to an element 17 in turn constrained on the hub 15, which is articulated on the control shaft 10 by interposition of a plurality of elastomeric bearings 19.

The joint 20 is, in the case illustrated, a homokinetic joint configured to transmit only the driving torque.

The joint 20 is also an elastic flexible joint configured to allow the oscillation of the axis D of the hub 15 with respect to the axis C of the control shaft 10.

As can be seen in FIG. 4, the control shaft 10 and the hub 15 have respective axes E, F that are radial and orthogonal with respect to the respective axes C, D.

The joint 20 is configured to allow the oscillation of the axis D around the axis C—and, therefore, of the axis F around the axis E—by a variable angle α comprised between 0 degrees (FIG. 3) and, in the case illustrated, +/−12 degrees (FIG. 4).

Advantageously, the joint 20 is defined by at least one corrugated element made of elastically deformable material; the corrugated element allows the inclination between the axes D, C through elastic deformation of the joint 20 itself.

In other words, the corrugation of the joint 20 allows to obtain an elastic flexural deformability such as to allow the oscillation of the axis D with respect to the axis C.

The joint 20 therefore behaves like an articulated joint, although it does not have components that are articulated with one another.

The term "corrugation" means, in the following of the present description, a continuous succession or continuous in some stretches and periodic succession of annular ridges and grooves around the axis C.

The corrugation has, in a section containing the axis C (FIGS. 4 and 5):
- a longitudinal direction of extension along which the ridges and the grooves are periodically repeated; and
- a transverse direction orthogonal to the direction of extension and along which the ridges and the grooves extend at a distance from each other.

The maximum distance between two consecutive ridges (grooves) along the longitudinal direction is called pitch p of the corrugation.

The distance between the ridges and the grooves along the transverse direction is called height h of the corrugation.

The joint 20 is symmetrical with respect to the axis C.

Figure 2:
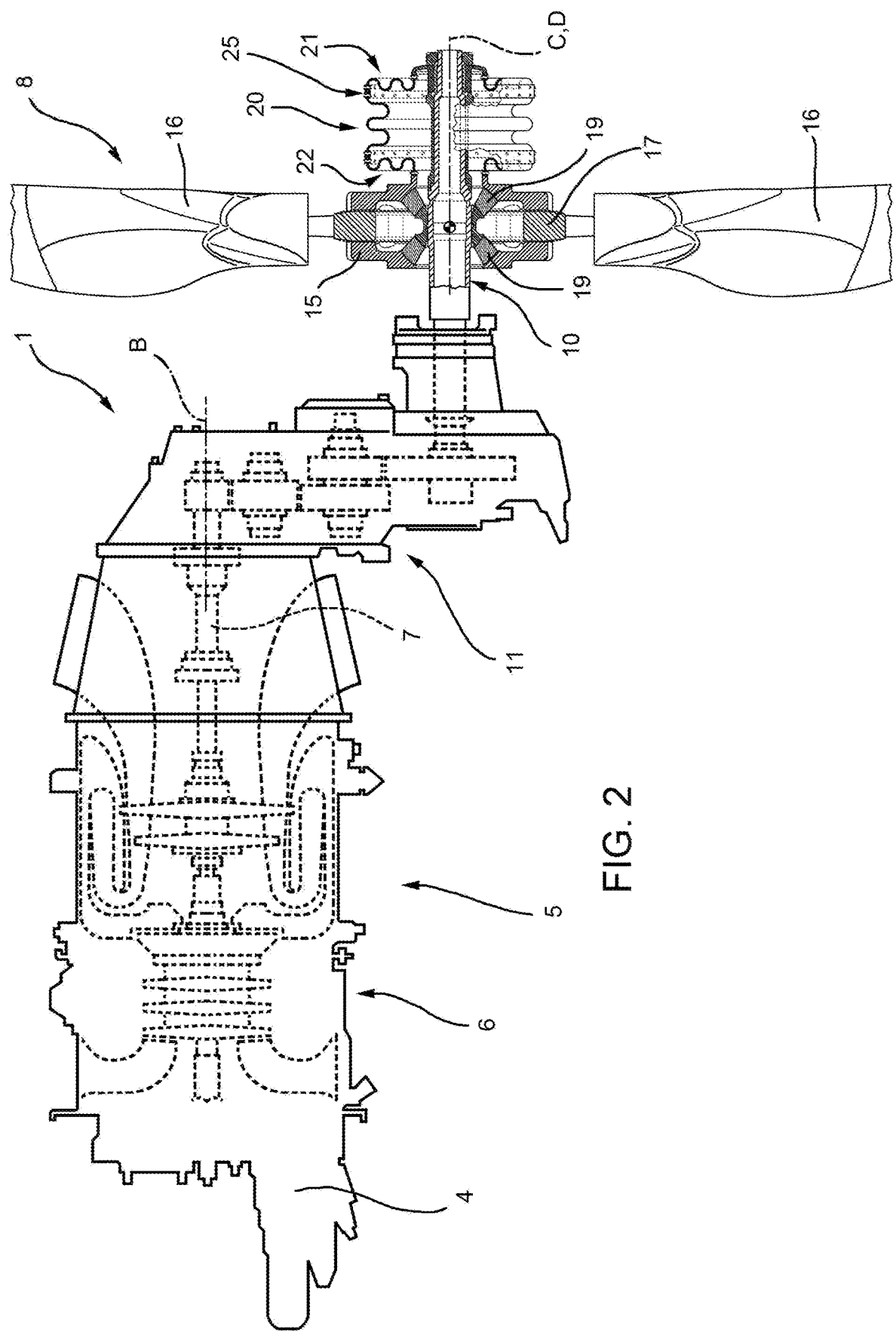
FIG. 2 illustrates on an enlarged and partially sectioned scale some components of the rotor of FIG. 1, with parts removed for clarity's sake.

With reference to FIG. 2, the joint 20 essentially comprises:
- a pair of head elements 21, 22 connected respectively to the control shaft 10 and to the hub 15; and
- an element 25 interposed between the elements 21, 22 and connected to the elements 21, 22 themselves.

The elements 21, 22 are discoidal and extend around the respective axes C, D.

The elements 21, 22 are corrugated and have respective corrugations 23, 24 with a longitudinal direction of extension that is radial to the axis C and a thickness parallel to the axis C.

The element 25 is tubular and has a corrugation 26 with a longitudinal direction of extension parallel to the axis C and a thickness radial to the axis C.

The corrugations 23, 24 of the elements 21, 22 comprise (FIG. 7), respective pluralities of rings 29, 30.

The rings 29, 30 are alternated with each other radially with respect to the axis C and define respective axial ends opposite one another of corresponding corrugations 23, 24.

The rings 29 are arranged at a first axial distance from the hub 15.

The rings 30 are arranged at a second axial distance from the hub 15 which is smaller than the aforesaid first axial distance.

The rings 29 (30) are all arranged at the same first (second) axial distance.

The corrugations 23, 24 each have a plurality of connecting stretches 31, each interposed between a respective ring 29 and the respective rings 30 adjacent thereto.

Each stretch 31 extends starting from the respective ring 29 at progressively increasing axial and radial distances towards the respective rings 30 adjacent thereto.

The corrugations 23, 24 have a coil shape in the section parallel to the axis B, in the case illustrated.

The rings 29, 30 lie on respective planes orthogonal to the axis B.

Corrugation 26 comprises respective pluralities of rings 35, 36.

The rings 35, 36 are alternated with each other parallel to the axis C and define respective radial ends opposite one another of the corrugation 26.

The rings 35 are arranged at a first radial distance from the axis C.

The rings 36 are arranged at a second radial distance from the axis C that is smaller than the aforesaid first radial distance.

The rings 35 (36) are all arranged at the same first (second) radial distance from the axis C.

The corrugation 26 has a plurality of connecting stretches 37, each interposed between a respective ring 35 and the respective rings 36 adjacent thereto.

Each stretch 37 extends starting from the respective ring 35 at progressively increasing axial and radial distances towards the respective rings 36.

The corrugation 26 has a coil shape in the section parallel to the axis C.

The corrugation 26 is symmetrical with respect to the axis C.

The rings 35, 36 lie on respective planes orthogonal to the axis C.

The corrugations 23, 24 comprise respective ends 33, 34 that are radially internal and connected to the control shaft 10 and to the hub 15.

In particular, the ends 33, 34 extend continuously and uniformly around the respective axes C, D.

The corrugations 23, 24 also comprise respective ends 39, 40 that are radially external and opposite to the corresponding ends 33, 34.

The corrugation 26 comprises opposite axial ends 41, 42 opposite one another and connected to respective ends 39, 40 of corresponding corrugations 23, 24.

In particular, the joint 20 is made of composite material, in particular a fibre-reinforced laminate.

Alternatively, the joint 20 could be made with different elastic materials such as metal or a combination of several materials.

In use, the convertiplane 1 lands and takes off in the "helicopter" configuration and advances in the "airplane" configuration.

In the "helicopter" configuration during hovering or at low speed, the lift necessary to support the convertiplane 1 is provided by the propellers 8 arranged with the respective axes C orthogonal to the axes A, E (FIG. 1).

In the "airplane" configuration, not illustrated, the lift necessary to support the convertiplane 1 is mostly provided by the half-wings 3.

The motors 6 drive the propellers 8 in rotation around the respective axes D.

More specifically, each motor 6 drives the relative control shaft 10 in rotation around the relative axis C.

The control shaft 10 drives the hub 15 in rotation around the axis D through the joint 20.

In greater detail, the joint 20 is homokinetic, i.e. the ratio between the rotation speeds of the control shaft 10 around the axis C and of the hub 15 around the axis D is constant, equal to one in the case illustrated, for each angular position of the control shaft 10 or of the hub 15 relative to the respective axes C, D.

This is obtained in that the ends 33, 34 extend continuously and uniformly around the respective axes B, C. Consequently, no "jerky" movements of the hub 15 are generated with respect to the shaft 10.

The joint 20 also allows the oscillation of the axis D with respect to the axis C so as to allow the oscillation of the axis E with respect to the axis F equal to the angle α comprised between 0 degrees (FIG. 3) and, in the case illustrated, 12 degrees (FIG. 4), thanks to the presence of the corrugations 23, 24; 26 and the fact that it is made of a fibre-reinforced composite laminate.

The joint 20 allows said oscillation thanks to its own flexural elastic deformation while it ensures the transmission of torque from the shaft 10 to the hub 15 through its own torsional rigidity.

This oscillation is due to the fact that the aerodynamic forces acting on the blades 16 are hardly ever perfectly symmetrical, for example due to a gust of wind or the variation of the cyclic pitch of the blades 16 themselves.

These non-symmetrical forces are also generated during the transition of the convertiplane 1 between the "airplane" and "helicopter" configurations or due to the gyroscopic forces generated in the event of perturbations acting on the blades 16.

Figure 5:
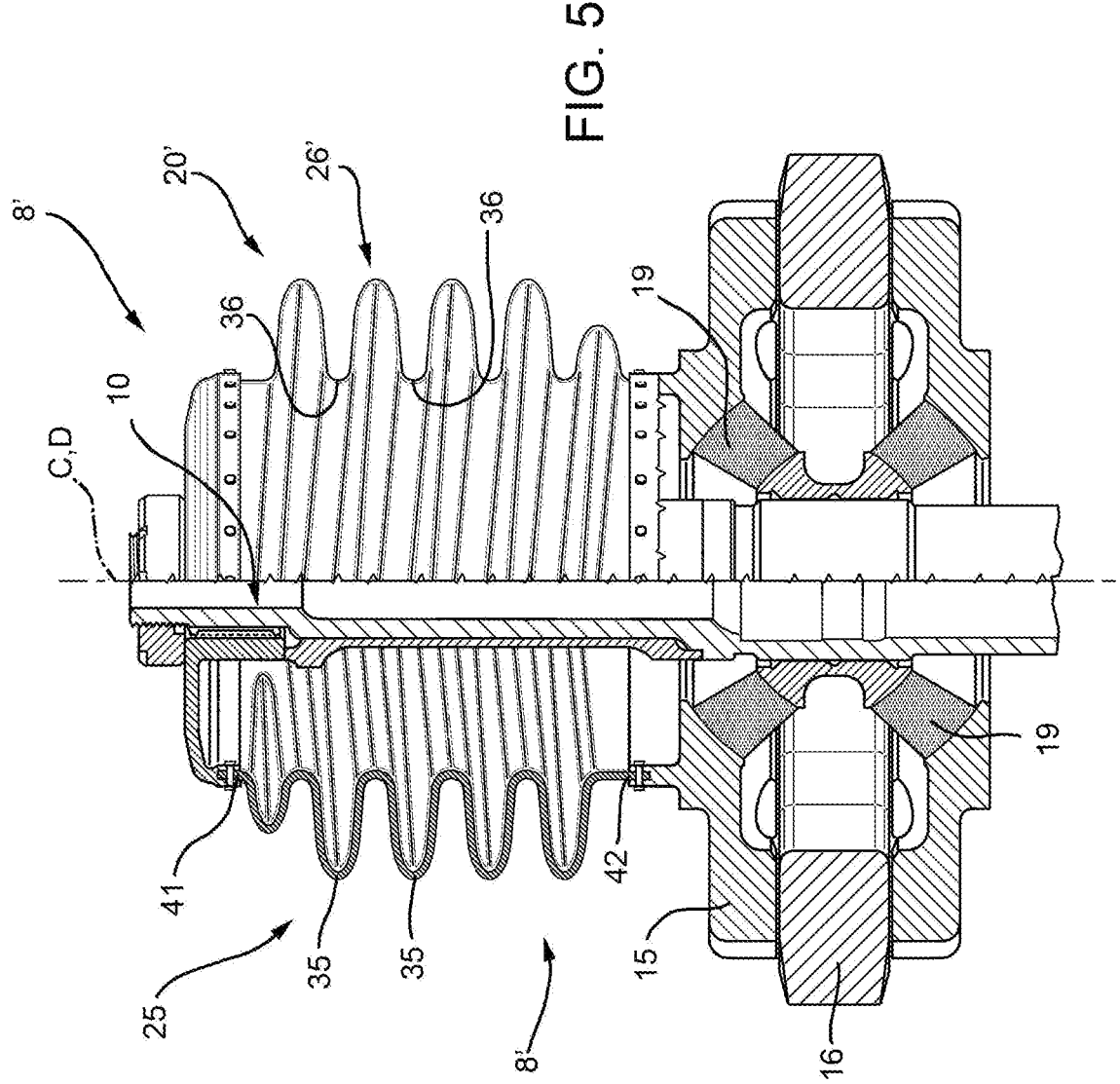
FIG. 5 illustrates in section some components of a second alternative embodiment of the rotor of the convertiplane of FIG. 1.

With reference to FIG. 5, 8' indicates a propeller according to a second embodiment of the present invention.

The propeller 8' is similar to the propeller 8 and will be described in the following only in so far as it differs from the latter; equal or equivalent parts of the propellers 8, 8' will be marked, where possible, with the same reference numbers.

The propeller 8' differs from the propeller 8 in that the joint 20' of the hub 15 does not comprise the elements 21, 22 and is formed by the element 25 only.

The propeller 8' also differs from the propeller 8 in that the corrugation 26' is helical.

The rings 35, 36 of the propeller 8' lie on respective planes orthogonal to the axis B.

The operation of the propeller 8' is similar to that of the propeller 8 and therefore is not described in detail.

Figure 6:
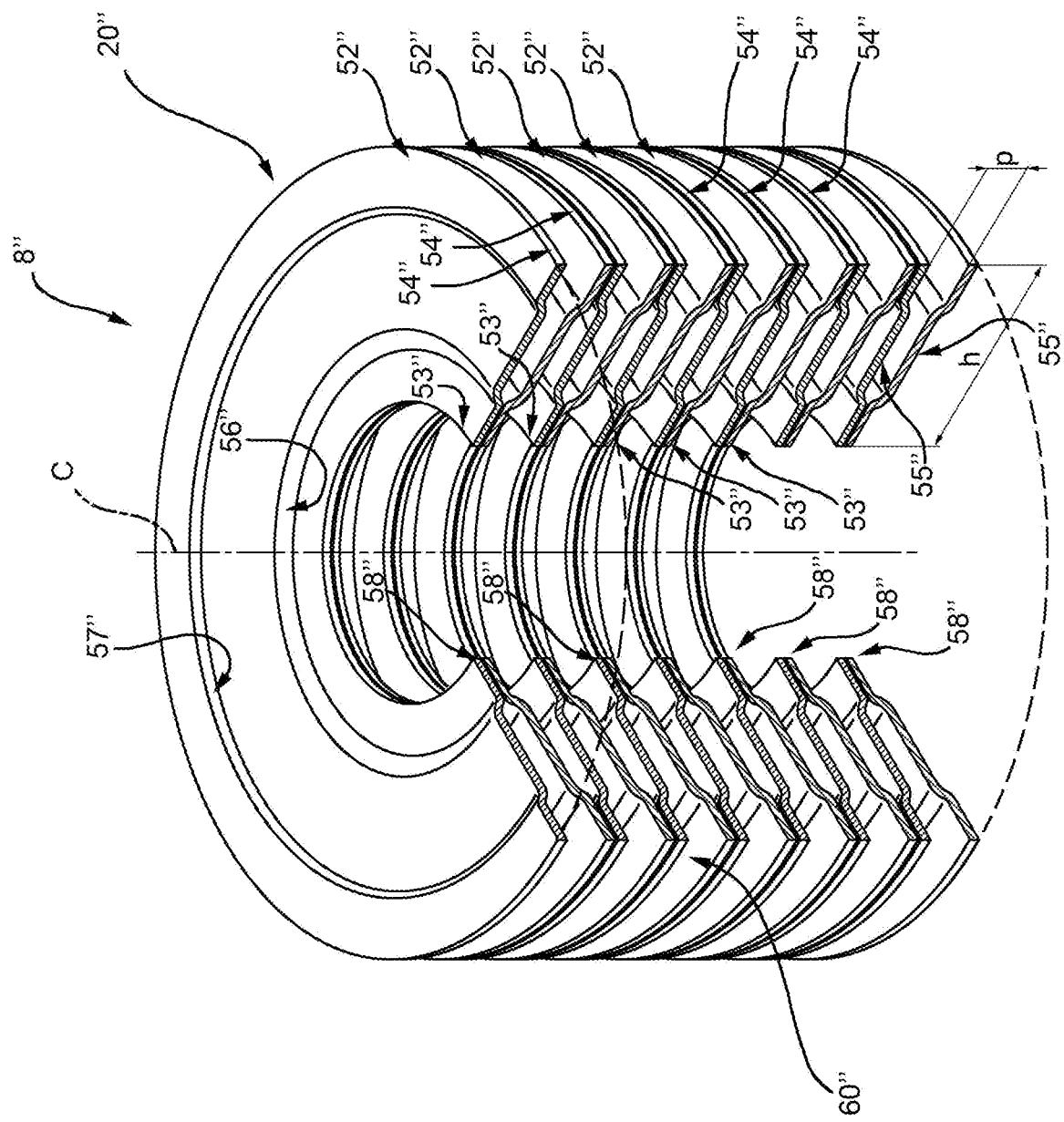
FIG. 6 illustrates a perspective view of some components of a third embodiment of the rotor of the convertiplane of FIG. 1.
Figure 7:
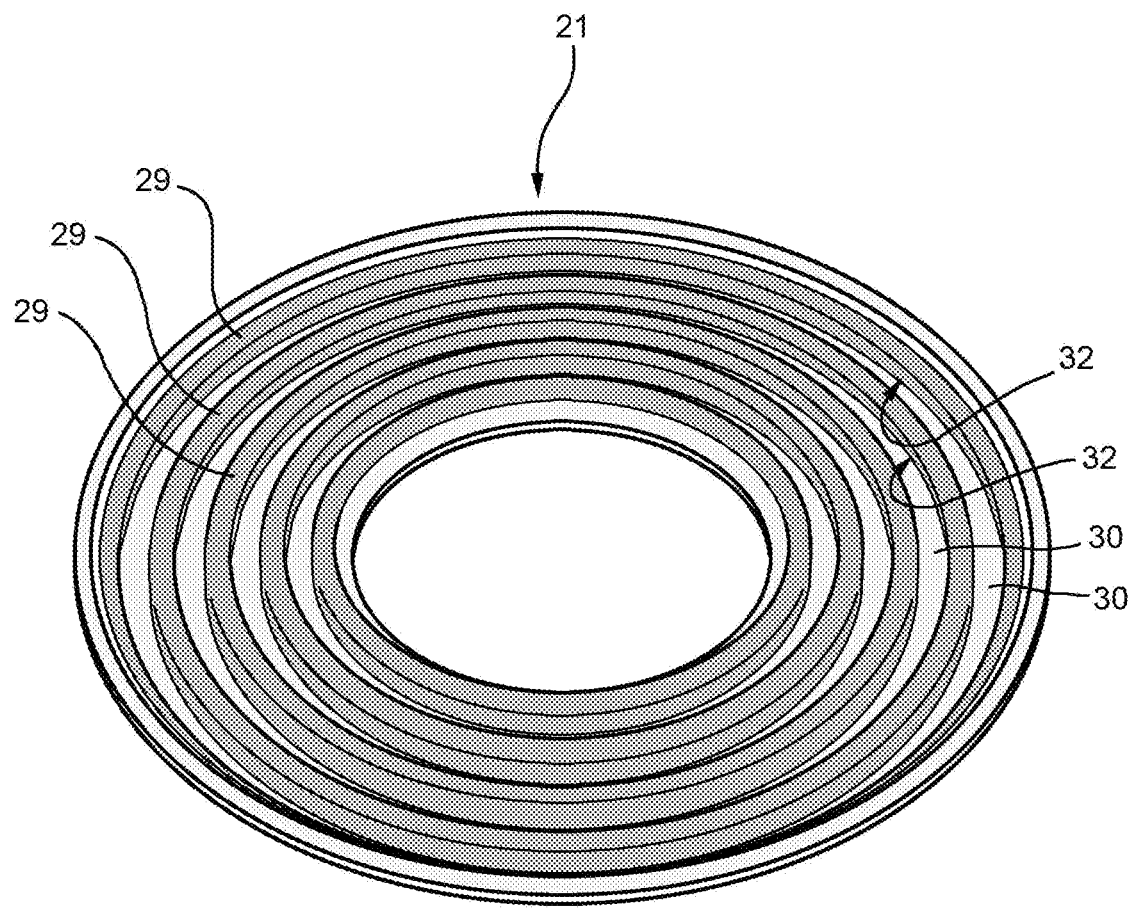
FIG. 7 illustrates in a perspective view and on a particularly enlarged scale a component of the rotor of FIGS. 2 to 4.

With reference to FIG. 6, 8" indicates a propeller according to a third embodiment of the present invention.

The propeller 8" is similar to the propeller 8 and will be described in the following only in so far as it differs from the latter; equal or equivalent parts of the propellers 8, 8" will be marked, where possible, with the same reference numbers.

The propeller 8" differs from the propeller 8 in that the joint 20" is formed by a plurality of shaped disks 52" superimposed on one another parallel to the axis C so as to form a corrugation.

The discs 52" are connected to one another, in particular by gluing or welding.

Each disc 52" essentially comprises:
a respective stretch 53" defining a radially internal end edge of the disc 52" itself;
a respective stretch 54" defining a radially external end edge of the disc 52" itself; and
a respective stretch 55" that is intermediate between the stretches 53", 54".

The stretches 53", 54", 55" of each disc 52" are shaped like respective circular crowns.

The stretch 55" of each disc 52" has a greater radial extension than the respective stretches 53", 54".

The stretches 53", 54", 55" are axially offset from one another.

In particular, the stretch 55" of each disc 52" is at a first axial distance from the stretch 53" of the same disc 52". The stretch 54" of each disc 52" is at a second axial distance from the stretch 53" of the same disc 52" which is greater than the first distance.

Each disc 52" also comprises in the case illustrated:
a stretch 56" that is curved and radially interposed between the relative stretches 53", 55"; and
a stretch 57" that is curved and radially interposed between the relative stretches 55", 54".

The joint 20" comprises a plurality of pairs 58" of discs 52".

The stretches 53" of the discs 52" of each pair 58" are connected to one another.

The stretches 54" of discs 52" of pairs 58" adjacent to each other are connected to one another.

In particular, the discs 52" of each pair 58" extend at a progressively increasing axial distance, proceeding from the respective stretches 53" up to the corresponding stretches 54".

The stretches 53", 54", 55" of the discs 52" define a corrugation 60".

The corrugation 60" has a longitudinal direction of extension parallel to the axis C and a thickness radial to the axis C.

More precisely, the stretches 55" connected to one another of adjacent discs 52" of consecutive pairs 58" define the ridges of the corrugation 60".

The stretches 53" connected to one another of discs 52" of the same pair 58" define the bellies of the corrugation 60".

The corrugation 60" has an h/p ratio greater than 1. The solution illustrated in FIG. 6 can be advantageous when particularly high h/p ratios are required for which it is not practical to corrugate a laminate in a single piece.

The operation of the propeller 8" is similar to that of the propeller 8 and is therefore not described in detail.

With reference to FIGS. 8 to 10, 100 indicates a helicopter comprising an anti-torque rotor 106''' according to a fourth embodiment of the invention.

The helicopter 100 essentially comprises:
a fuselage 102;
one or more turbines 105;
a main rotor 103 placed at a top of the fuselage 105 and rotatable around a first axis; and
the anti-torque rotor 106''', which is placed at a tail end of the fuselage 102 and rotatable around its own axis H transverse to the axis of the rotor 103.

The helicopter 100 further comprises a transmission group 111, which transmits the motion from the turbines 105 to the main rotor 103 and to the rotor 106".

The transmission assembly 111 is illustrated limitedly to an auxiliary output shaft 108 rotatable around an axis I and operatively connected to the anti-torque rotor 106, as will be described in greater detail below.

The rotor 106''' generates a thrust, which brings about a contrasting torque on the fuselage 102.

Said contrasting torque is oriented in the opposite direction to the torque exerted by the rotor 103 on the fuselage 102.

According to the thrust value generated by the rotor 106''', it is therefore possible to orient the helicopter 100 according to a desired yaw angle, or to adjust the aforesaid yaw angle according to the manoeuvre to be performed.

In greater detail, the rotor 106''' essentially comprises:
a control shaft 112 rotatable around an axis J and operatively connected to the shaft 108; and
a plurality of blades 109, in the case illustrated two in number, which are rotatable around the axis H and extend in a cantilever manner along respective axes transversal to the axis J.

The anti-torque rotor 106''' also comprises a joint 20''' interposed between the shaft 112 and the shaft 108.

The joint 20''' is similar to the joint 20 and will be described below only in so far as it differs from the latter; equal or equivalent parts of the joints 20, 20''' will be marked, where possible, with the same reference numbers.

The joint 20''' is configured to transmit a torque between the shaft 108 and the shaft 112 having respective axes I, J inclined with respect to each other by a constant angle β.

The joint 20''' is axial-symmetrical along a curved axis K and joining the axes I, J.

The joint 20''' comprises (FIGS. 8 to 10) essentially:
a pair of elements 120''', 121''' connected to each other and connected respectively to the shaft 112 and the shaft 108; and
a plurality of support elements 115''', 116''', 117''', three in the case illustrated, interposed between the joint 20''' and the fuselage 102 and adapted to support the joint 20''' allowing its elastic rotation around the axis K.

The helicopter 100 also comprises (FIG. 12):
a joint 200 interposed between the shaft 108 and the element 120'''; and
a joint 201 interposed between the element 121''' and the shaft 112.

In greater detail, the elements 120''', 121''' define respective corrugations 124''', 125'''.

Each corrugation 124''', 125''' has a direction of longitudinal extension that is curved and parallel to the axis K and a thickness along a direction orthogonal to the axis K.

Each corrugation 124''', 125''' comprises respective pluralities of rings 126''', 127'''.

The rings 126''', 127''' are alternated with each other parallel to the curvilinear axis K and define respective radial ends opposite one another of the respective corrugation 124''', 125'''.

The rings 126''' are arranged at a first radial distance from the axis K.

The rings 127''' are arranged at a second radial distance from the axis K that is smaller than the aforesaid first radial distance.

The rings 126''' (127''') are all arranged at the same first (second) radial distance from the axis K.

The corrugation 124''', 125''' has a plurality of connecting stretches 128''' each interposed between a respective ring 126''' and the respective rings 127''' adjacent thereto.

Each stretch 128''' extends starting from the respective ring 126''' at progressively increasing axial and radial distances towards the respective rings 127'''.

The corrugation 124''', 125''' has a coil shape in a section obtained in a plane parallel to the axis K, in the case illustrated.

The corrugation 124''', 125''' is symmetrical with respect to the axis K.

The rings 126''', 127''' lie on respective planes orthogonal to the axis K.

The elements 120''', 121''' comprise respective flanges 129'''.

The support element 115''' comprises a double-row rolling bearing 130''', in the case illustrated.

The bearing 130''' essentially comprises:
an inner ring that is rotatable integrally with the joint 200 and with a flange 129''' of the element 120'''; and
an outer ring fixed to the fuselage 102.

The support element 116''' comprises a rolling bearing 131''' with tapered rollers, in the case illustrated.

The bearing 131''' essentially comprises:
an inner ring that is rotatable integrally with the other flange 129''' of the element 120''' and with a flange 129''' of the element 121'''; and
an outer ring fixed to the fuselage 102.

The support element 117''' comprises a rolling bearing 132''', with tapered rollers in the case illustrated.

The bearing 132''' essentially comprises:
an inner ring that is rotatable integrally with the other flange 129''' of the element 121''' and with the joint 201; and
an outer ring fixed to the fuselage 102.

In use, the turbines 105 drive the transmission group 111.

The transmission group 111 drives in rotation the main rotor 103 and the auxiliary shaft 108 around the axis I.

The auxiliary shaft 108 drives in rotation the anti-torque rotor 106 through the shaft 108 that is rotatable around the axis I and through the joint 20'''.

In greater detail, the elements 120''', 121''' of the joint 20''' allow the misalignment between the axes I, J by a fixed angle (FIG. 10).

The joint 20''' allows said misalignment thanks to its own elastic flexural deformation in the plane containing the axes I, J, K.

More precisely, the joint 20''' deforms elastically flexurally in such a way as to keep the angle between the axes I, J constant, thanks to the presence of the corrugations 124''', 125''' which provide torsional rigidity and at the same time flexural flexibility and to the fact that it is made of a fibre-reinforced composite laminate.

With reference to FIG. 11, 106'''' indicates an anti-torque rotor according to a fifth embodiment of the invention.

The rotor 106'''' is similar to the rotor 106''' and will be described in the following only in so far as it differs from the latter; equal or equivalent parts of the rotors 106''', 106'''' will be marked, where possible, with the same reference numbers.

The rotor 106'''' differs from the rotor 106''' in that it comprises three elements 120'''', 121'''', 122'''' with respective corrugations 124'''', 125'''', 123'''', and in that it comprises four support elements 115'''', 116'''', 117'''', 118'''' with respective bearings 130'''', 131'''', 132'''', 133''''.

The operation of the rotor 106'''' is similar to that of the rotor 106''' and is therefore not described in detail.

With reference to FIG. 12, 106''''' indicates an anti-torque rotor according to a sixth embodiment of the invention.

The rotor 106''''' is similar to the rotor 106''' and will be described in the following only in so far as it differs from the latter; equal or equivalent parts of the rotors 106''''', 106''' will be marked, where possible, with the same reference numbers.

The rotor 106''''' differs from the rotor 106''' in that the corrugations 124''''', 125''''' are helical with respect to the axis K and the rings 126''''', 127''''' lie on respective planes orthogonal to the axis K.

With reference to FIG. 13, 106'''''' indicates an anti-torque rotor according to a seventh embodiment of the invention.

The rotor 106'''''' is similar to the rotor 106'''' and will be described below only in so far as it differs from the latter; equal or equivalent parts of the rotors 106'''''', 106'''' will be marked, where possible, with the same reference numbers.

The rotor 106""" differs from the rotor 106"" in that the corrugations 124"', 125"', 123"' are helical with respect to the axis K and the rings 126"', 127"' lie on respective planes orthogonal to the axis K.

In a further embodiment not illustrated, the elements 120"', 121"'; 120"", 121"" of the joint 20"' could be made of metal, for example, titanium and optionally coated with a jacket of fibreglass or other fibre-reinforced material.

The aforesaid elements 120"', 121"'; 120"", 121"" of said further embodiment can be also easily made by means of additive manufacturing technology. In this way, problems in removing the internal spindle that would be necessary with other methods for manufacturing composite products are avoided.

The advantages the present invention allows to obtain are evident from the characteristics of the propeller 8, 8', 8" of the convertiplane 1 and the anti-torque rotor 106"', 106"", 106""', 106"""' of the helicopter 100 according to the present invention.

In particular, the propeller 8, 8', 8" and the anti-torque rotors 106"', 106"", 106""" comprise respectively the joints 20, 20', 20"; 20"' with the respective corrugations 23, 24, 26, 26'; 124"', 125"', 124"", 125"", 123"'; 124"", 125""'; 124""", 125""", 123""".

Said corrugations 23, 24, 26, 26'; 124"', 125"', 124"", 125"", 123"'; 124"", 125""'; 124""", 125""", 123""" confer to the joints 20, 20', 20", 20"' a high flexural elastic deformability associated with a high transmission capacity of torsional load.

In other words, the corrugations 23, 24, 26, 26'; 124"', 125"', 124"", 125"", 123"'; 124"", 125""'; 124""", 125""", 123""" allow to decouple the rigidities and the load paths.

The ends 33, 34 extend continuously and uniformly around the respective axes C, D, K. This allows to guarantee the homokinetic operation of the joint 20, 20', 20", 20"'.

It is important to underline that these characteristics are obtained without requiring the use of numerous components articulated with one another unlike the solutions of the known type and discussed in the introductory part of the present description, with evident advantages of reduction in weight and construction simplification.

In this way, the joint 20, 20', 20" allows the motion to be transmitted between the control shaft 10 and the hub 15 enabling a variable oscillation between the axes E, F, in the case illustrated between 0 and 12 degrees during operation of the convertiplane 1.

In greater detail, the corrugations 23, 24, 26, 26' confer to the joint 20, 20', 20" a very high capacity of torsional load—i.e. of transmission of a torque moment of axis B from the control shaft 10 to the hub 15—together with a high flexural flexibility in the planes containing the axes C, D and an axial flexibility, which allows the aforesaid oscillation between the axes C, D.

The joint 20"' allows the motion to be transmitted between the shafts 12, 16 having respective axes I, J inclined with respect to each other by a constant angle.

In other words, the joint 20"' allows the bevel gear usually provided between the aforesaid shafts 108, 112 of the anti-torque rotor 106"', 106"", 106""", 106"""' to be replaced effectively and with weight/cost reductions.

The helical conformation of the corrugations 23, 26'; 124""", 125""'; 124""", 125""", 123""" enable raising the torsional resistance in one direction. This is particularly advantageous in that the maximum torque acting on the joints 20, 20'; 20", 20"' is always directed in one direction.

The elements 120"', 121"'; 120"", 121"" of the joint 20"' could be, in a further embodiment, made of metal, for example, titanium and coated with a jacket of fibreglass or fibre-reinforced composite material. In this way, a catastrophic failure of the joint 20"' would be avoided in the event that a crack was generated that would lead to failure.

Finally, the joint 20" formed by discs 52" allows to obtain particularly high h/p ratios thanks to the fact that it does not entail problems in removing the internal spindle that would be necessary with other manufacturing methods.

Said characteristics of the joint 20, 20', 20", 20"' can be optimized by suitably selecting the lamination sequence of the fibre-reinforced material of the elements 21, 22, 25, 120"', 121"', 120"", 121"".

It is clear that modifications and variations may be made to the propeller 8, 8', 8" of the convertiplane 1 and to the anti-torque rotor 106"', 106"", 106""', 106"""' of the helicopter 100 described and illustrated herein without thereby departing from the scope of protection defined by the claims.

In particular, the corrugations 23, 24, 26 could also be helical.

The anti-torque rotor 106"' could comprise the joint 20" instead of the joint 20"' interposed between the shaft 112 and the shaft 108.

One or more of the corrugations 23, 24, 26, 26'; 124"', 125"', 124"", 125"", 123"'; 124"", 125""'; 124""", 125""", 123""" could be shaped at least in part as a plurality of broken segments joined to each other and/or with curved stretches, or they could be shaped like an arc.

The invention claimed is:

1. A convertiplane comprising:
    a fuselage extending along a first axis;
    a pair of half-wings extending from respective side bands opposite one another of said fuselage along respective second axes;
    a pair of rotors associated with said half-wings, rotatable around respective third axes and inclinable around a fourth axis orthogonal to said second and first axis between:
    a first position in which said third axes are parallel to said first axis, which position is reached when said convertiplane is, in use, in an airplane configuration; and
    a second position in which said third axes are orthogonal to said first axis, which position is reached when said convertiplane is, in use, in a helicopter configuration;
    each said rotor comprising:
    an input shaft rotatable around a respective fifth axis;
    an output member rotatable around a respective said third axis;
    a coupling element functionally interposed between said input shaft and said output member and adapted to transmit the motion from said input shaft to said output member;
    said coupling element being configured to allow, in use, an inclination by a variable angle between the respective said respective fifth axis and said respective third axis;
    characterized in that said coupling element comprises at least a first corrugated element made of an elastically deformable material;
    said first corrugated element allowing said inclination through elastic deformation;
    said input shaft being a control shaft of the respective said propeller rotatable around the respective said fifth axis;
    said output member being a hub on which a plurality of respective blades are articulated and rotatable around a respective said third axis;

said coupling element is configured to allow, in use, said variable oscillation angle between respective said fifth and third axes;

wherein said coupling element is homokinetic; and/or characterized in that said coupling element is torsionally rigid in a plane orthogonal to said fifth and third axis and flexurally yielding in at least one plane parallel to said fifth and third axis.

2. The convertiplane according to claim 1, characterized in that said first corrugated element is axial-symmetrical around a sixth axis and has a first corrugation;

said first corrugation having a direction of extension parallel to said sixth axis and a radial thickness with respect to said sixth axis.

3. The convertiplane according to claim 2, characterized in that said first corrugation comprises at least a first ring radially external with respect to said sixth axis and axially interposed between two second rings radially internal with respect to the fifth axis itself;

said first ring and second rings being defined by a single said first corrugated element.

4. The convertiplane according to claim 1, characterized in that it comprises at least a second corrugated element;

said second corrugated element being discoidal and comprising a second corrugation with a direction of extension radial to said fifth axis and a parallel thickness with respect to said fifth-axis.

5. The convertiplane according to claim 2, characterized in that said first corrugation is helical; and/or characterized in that said fifth and sixth axes coincide with each other.

6. A convertiplane comprising:
a fuselage extending along a first axis;
a pair of half-wings extending from respective side bands opposite one another of said fuselage along respective second axes;
a pair of rotors associated with said half-wings, rotatable around respective third axes and inclinable around a fourth axis orthogonal to said second and first axis between:
a first position in which said third axes are parallel to said first axis, which position is reached when said convertiplane is, in use, in an airplane configuration; and
a second position in which said third axes are orthogonal to said first axis, which position is reached when said convertiplane is, in use, in a helicopter configuration;
each said rotor comprising:
an input shaft rotatable around a respective fifth axis;
an output member rotatable around a respective said third axis;
a coupling element functionally interposed between said input shaft and said output member and adapted to transmit the motion from said input shaft to said output member;
said coupling element being configured to allow, in use, an inclination by a variable angle between the respective said respective fifth axis and said respective third axis;
characterized in that said coupling element comprises at least a first corrugated element made of an elastically deformable material;
said first corrugated element allowing said inclination through elastic deformation;
said input shaft being a control shaft of the respective said propeller rotatable around the respective said fifth axis;
said output member being a hub on which a plurality of respective blades are articulated and rotatable around a respective said third axis;

said coupling element is configured to allow, in use, said variable oscillation angle between respective said fifth and third axes;

wherein said coupling element comprises a plurality of axially corrugated discs superimposed on one another and connected to one another;

said discs comprising first radially internal ends and second radially external ends axially offset with respect to said first radially internal ends.

7. The convertiplane according to claim 6, characterized in that each said disc comprises a stretch interposed radially and axially between the respective said first and second end.

8. The convertiplane according to claim 6, characterized in that said discs axially consecutive to one another comprise respective said first radially internal ends connected to one another and/or respective second radially external ends connected to one another.

9. The convertiplane according to claim 1, characterized in that said at least one first corrugated element is made of a fibre-reinforced composite material.

10. The convertiplane according to claim 1, characterized in that said coupling element comprises a first and a second end edge connected respectively to said input shaft and said output member;

said first and second end edges being circular and circumferentially continuous so as to make said coupling element homokinetic.

11. A convertiplane comprising:
a fuselage extending along a first axis;
a pair of half-wings extending from respective side bands opposite one another of said fuselage along respective second axes;
a pair of rotors associated with said half-wings, rotatable around respective third axes and inclinable around a fourth axis orthogonal to said second and first axis between:
a first position in which said third axes are parallel to said first axis, which position is reached when said convertiplane is, in use, in an airplane configuration; and
a second position in which said third axes are orthogonal to said first axis, which position is reached when said convertiplane is, in use, in a helicopter configuration;
each said rotor comprising:
an input shaft rotatable around a respective fifth axis;
an output member rotatable around a respective said third axis;
a coupling element functionally interposed between said input shaft and said output member and adapted to transmit the motion from said input shaft to said output member;
said coupling element being configured to allow, in use, an inclination by a variable angle between the respective said respective fifth axis and said respective third axis;
characterized in that said coupling element comprises at least a first corrugated element made of an elastically deformable material;
said first corrugated element allowing said inclination through elastic deformation;
said input shaft being a control shaft of the respective said propeller rotatable around the respective said fifth axis;
said output member being a hub on which a plurality of respective blades are articulated and rotatable around a respective said third axis;
said coupling element is configured to allow, in use, said variable oscillation angle between respective said fifth and third axes;

wherein said at least one first corrugated element is made of a metallic material coated with a jacket of fibreglass.

* * * * *